July 1, 1969  J. TANQUERAY  3,452,884
MACHINE TO STACK BARS

Filed Feb. 1, 1968  Sheet 1 of 2

INVENTOR
JACQUES TANQUERAY
BY *Henry C. Westin*
ATTORNEY

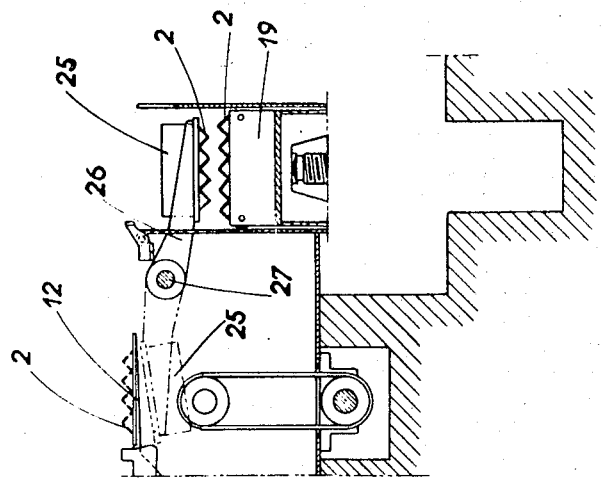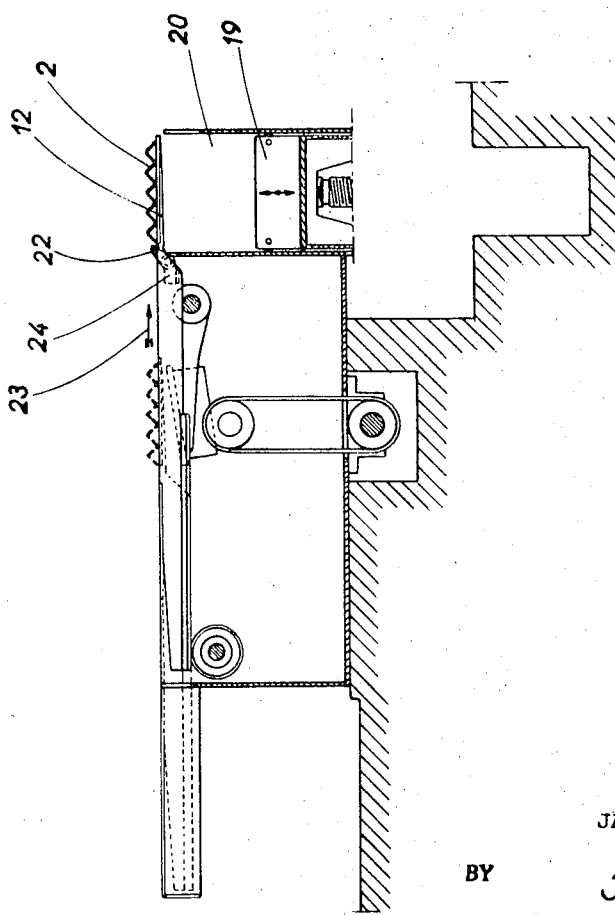

United States Patent Office 3,452,884
Patented July 1, 1969

3,452,884
MACHINE TO STACK BARS
Jacques Tanqueray, Maisons-Laffitte, France, assignor to Secim, Courbevoie, France, a company of France
Filed Feb. 1, 1968, Ser. No. 702,403
Claims priority, application France, Feb. 2, 1967, 93,484
Int. Cl. B65g 57/03, 59/02
U.S. Cl. 214—6.5                                8 Claims

ABSTRACT OF THE DISCLOSURE

The invention relates to a machine for stacking bars regardless of the cross section and the material which forms them and, in particular, applicable for stacking metallic bars of flat or profile cross sections, such as C-sections, T-sections, angle irons in a manner to form stable and coherent bundles.

---

The stacking and the preparation of the bundle of bars and, in particular, of angle irons up to now has been made by aligning the products in layers, then by adding a second layer to a first layer by reversing the products by an electromagnet in order to obtain imbricate rows.

The presently existing machines have a relatively small capacity which is lower than the output of bars of the distributors, thus they limit the use of the latter. Moreover, some machines necessitate changing the electromagnet for each type of product handled.

The invention remedies these difficulties, avoids time losses, and assures a quicker evacuation of the bars than the output of the distributor.

Finally, the machine, according to the invention, necessitates the use of only one type of electromagnet.

According to the invention, the machine comprises, in combination, a table for forming a layer of bars, support members for receiving this layer, horizontal arms rotatably movable across the table for receiving bars and transporting the layer from the table to these support members, rectilinear drive means for advancing the support members to a stacking table which is controlled by a vertical displacement device, and at least one electromagnet mounted on an arm driven in rotation around a horizontal axis, said arm passes between the receiving support members where it takes from these members a layer of bars and turns the layer over to deposit it on the preceding layer which has already been transported to the stacking table by the receiving support members.

The invention will now be described in greater detail while referring to a particular practical example given for the sake of an example and shown in the following drawings.

FIGURE 2 shows only part of the machine of FIGURE 1 with the aim of simplification of the design and in order to give a better understanding of the functioning of the machine, the horizontal arms for the displacement of a layer of bars and their control have not been shown in FIGURE 2.

FIGURE 3 shows, likewise, a part of the machine of FIGURE 1, while the horizontal arms and the receiving support members for the layer of the bars have not been shown, only the device for the displacement having been represented which turns a layer of bars around with the aid of an electromagnet.

Figure 1:
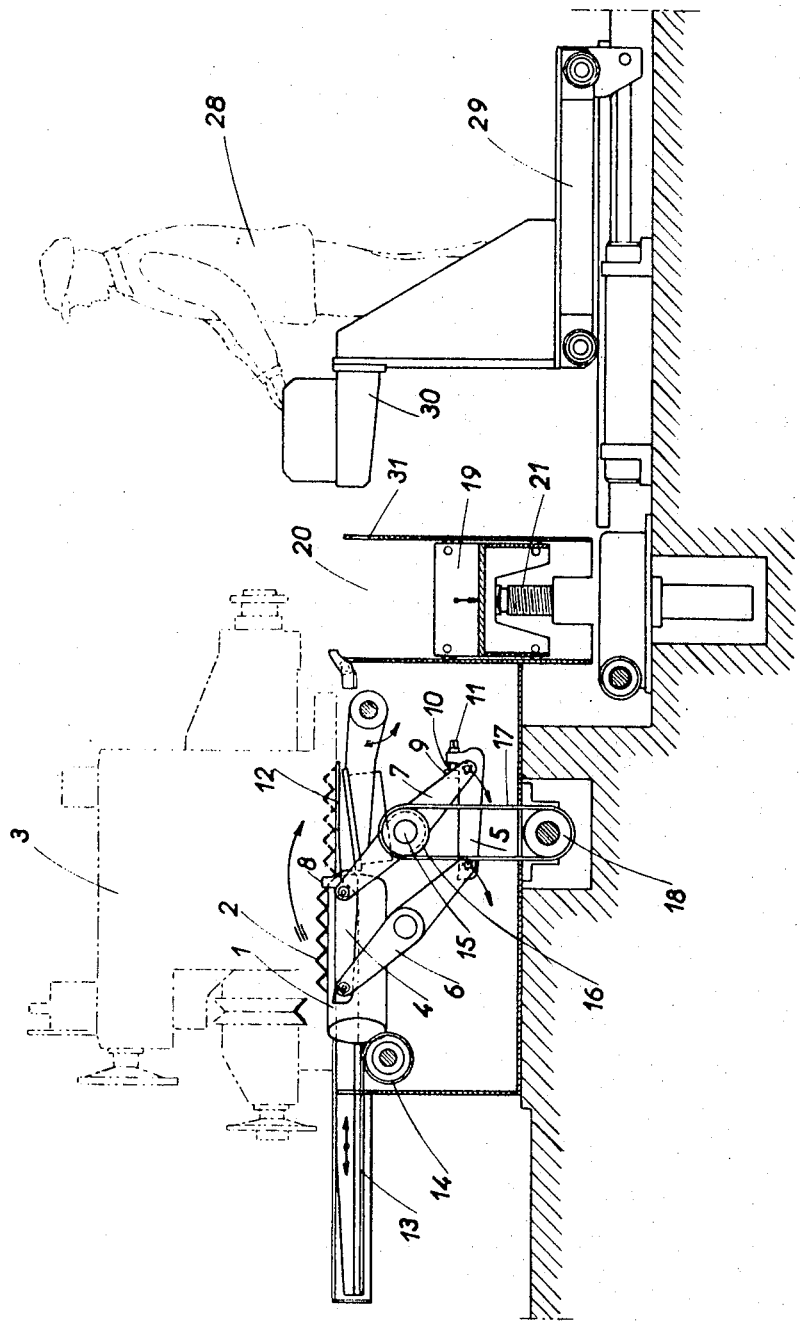
FIGURE 1 is a vertical section of a machine according to the invention through a plane parallel to the passage of layer of products from the gathering table where a layer is formed to the stacking table where the stack is formed.

The machine shown in the design permits successive stacking of layers, either turned over or not, according to the products, in such a way as to form a load whose commercial dimensions can be determined in advance. This load can be dispatched either straight ahead or sideways toward a stand of manual or automatic bundling supplied by an assembly of several machines.

The simplicity and the sequence of the mechanical movements of the machine would allow the use of an industrial drive with the aid of programmed automatic control.

FIGURE 1 shows a machine according to the invention which comprises a gathering or forming table for forming a layer of bars which, here, are angle irons. The forming table consists of oblique horizontal rollers 1, with respect to the plane of the figure. The table with the oblique rollers 1 carries out the formation of a layer of angle irons 2, while the different rollers 1 of the table are in controlled rotation and are arranged at the exit of a distributor which, e.g., could be a straightening machine 3 as shown dotted in FIGURE 1.

The products to be stacked, i.e., here the angle irons 2, will line up on the table for the formation of stacks, with oblique rollers 1, against the shoulders 8 or 9 of arms 4 or 5.

The products are distributed either one by one for aligning on the roller table 1 or by layer parts, or by whole layers already formed, while the roller table does not do anything else in the latter case other than performing a lateral transfer of the layer.

The displacement of the layer takes place by a rotating transfer device comprising horizontal arms 4 and 5 which are articulated on the crankpins 6 and 7 of an assembly of crankshafts which are diametrically opposed with respect to the axis of rotation of the crankshafts.

As noted above, the horizontal arms 4 and 5 are equipped with shoulders 8 and 9. The shoulder corresponding to a horizontal arm, e.g., shoulder 8 in the case of FIGURE 1, goes beyond the plane of the formation of the layer, while the horizontal arm 4 is waiting under the rollers of this table.

The shoulder 9 carried by the horizontal arm 5 is displaceable with respect to this arm by means of a screw 10 operated manually from its end with a square cross section 11 or by any other means of controlling. The screw 10 permits to determine the position of the shoulder 9 with respect to the horizontal arm 5, i.e., to determine the displacement of the position of a layer of angle irons 2 with respect to the following layer from the fact of the succession of the arms 4 and 5.

On the side of the roller table there is arranged a series of support members 12. These support members are subjected to a back-and-forth movement and carry at their lower end a rack 13, each in mesh with a pinion 14 driven in alternate rotation.

Thus the support members can move away from the roller table 1 or come closer to the latter carrying the layer of products 2 which they have received from horizontal arms 4 and 5.

These arms are driven in their rotation by the axle 15 of the crankshaft carrying the crankpins 7, this axle being of one part with a pinion 16 on which passes a chain 17 driven by a pinion 18 turned by a motor.

It is to be noted that the pinion 16 of the drive of axle 15 of the crankshaft carrying the crankpins 7 could be achieved by any other means as, for instance, by means of pulleys and belts, or by means of a gear train.

The arms 4 and 5 can alternately transport a layer of products carried by the roller table 1 to the receiving support members 12.

When the receiving support members 12 have received a layer of products, the support members are moved in rectilinear displacement to the right of FIGURE 1 or FIGURE 2 up to the stacking table 19.

This stacking table 19 is located in a vertical slot 20 and moves in this slot by the action of a screw 21, for instance, or any other means for displacement. The mounting of the stacking table 19 permits it to be positioned to collect the layer of the products 2 which have been brought there by the receiving support members 12.

The stacking table 19 consists of parallel supports which can pass between the support members 12 to receive the products 2.

When the table 19 has received the products 2, the receiving support members 12 move to the left of FIGURE 2 and the layer of products 2 is retained by the retractable supports 22. These supports mounted in a rotatable manner on the frame of the machine move aside when the layer of products 2 passes by and when the layer moves in the sense of the arrow 23 (FIGURE 2). On the other hand, when the support members 12 move toward the left, the massive part 24 of every support raises that support 22 and the latter resists return of the layer of products 2. This layer is thus deposited on the stacking table 19 which now can go down in its slot while the support members 12 go back into position to receive a new layer coming from the table which is deposited on the support members by the horizontal arms 5 which have taken the place of the horizontal arms 4 during the rotation of the crankshafts.

The table with the oblique rollers 1 receives or forms a new layer of products which is being aligned by the shoulders 9 whose displacement is controlled by the screws 10 with respect to the position of the preceding layer. The arms 5 carry this layer of products and deposit it on the receiving support members 12 in a position shown in FIGURE 3. From this position the layer of products 2 is lifted off the support members 12 by an electromagnet 25 which passes between the support members 12, and this electromagnet is carried by an arm 26 driven in rotation by a shaft 27.

The electromagnet turns the layer of products 2 over and deposits it on the layer which already has been brought to the stacking table 19.

In FIGURE 3 the layer of products 2 carried by the receiving support members 12 has been shown in dots as well as the position of the electromagnet 25 which belongs to it; on the other hand, the position of the electromagnet at the moment when it deposits the layer of products 2 on the previously deposited layer on the stacking table 19 has been shown in full lines.

The electromagnets 25 contain plates whose number and dimensions are determined depending on the lengths and the weights of the layers of products to be handled.

The machine just described thus receives on the roller table 1 successive layers of bars of any cross section, for instance, angle irons as shown in the design. These layers are carried in succession by the arms 4 and 5 onto the receiving support members 12, one layer is transported by these support members 12 to the stacking table 19 while the following layer is seized by the electromagnet 25, is turned over, and is placed on top of the preceding layer with which it imbricates on the stacking table 19.

Thus, one has a succession of two operations which permits very quick realization of stacking products of desired weights and dimensions without retarding the apparatus and machines preceding the stacking machine.

When the weight and the dimensions of the completed stack are attained on the stacking table 19, the latter is lifted up by the screw 21, and an operator 28 controls the advancement of a carriage 29 carrying supports 30 which place themselves between the supports forming the stacking table 19 when the latter is lifted to the interior of the slot 20. The supports 30 pass across a window 31 arranged in the wall of the slot 20, getting under the stack of bars 2, and when the stacking table 19 goes down again, the stacked bars rest on the supports 30. Now they can be retracted from the slot 20 and the operator 28 can bundle them by hand or send them in a different direction for automatic bundling, for instance.

The machine just described comprising the different receiving elements, elements for transferring, turning over, and stacking, can easily be controlled automatically according to a program provided in advance.

It can, for instance, treat products whose commercial length is in the order of 18 meters but it can likewise handle products of a lesser length, for instance of 8 to 9 meters or of 5 to 6 meters, working in two or three distinct ranges.

Well understood, the invention is not limited by the details of the practical example just described; they can be modified without leaving the framework of the invention.

In accordance with the provisions of the patent statutes, I have explained the principle and operation of my invention and have illustrated and described what I consider to represent the best embodiment thereof.

I claim:

1. A machine for stacking bars comprising:
   an horizontal platform on which a number of bars are arranged in layer-like fashion,
   an horizontal support member arranged on one side of said platform for supporting and receiving a layer of bars in a layer receiving position.
   a pair of arms each having horizontally disposed bar carrying surfaces,
   means for positioning said arms to bring the bar carrying surfaces of each arm alternately into a position to lift a layer of bars from said platform and for depositing the same layer on said support member,
   means for moving said support member from said layer receiving position to a layer discharging position,
   a layer stacking member arranged in said discharge position of said support member and having means for vertically displacing said stacking member towards and away from said discharge position, and
   a layer supporting arm supported in a manner to rotate about an horizontal axis having an electromagnet, said rotating arm adapted to be positioned to remove a layer of bars from said support member when in said layer receiving position and rotate it 180° and deposit the layer on said stacking member.

2. A machine for stacking bars according to claim 1, characterized by the fact that the means for positioning the arms comprises a crankshaft assembly.

3. A machine for stacking bars according to claim 1, characterized by the fact that the means for moving said support means comprises a rack and power driven pinion assembly.

4. A machine for stacking bars according to claim 1, characterized by the fact that the means for vertical displacement of said stacking member comprises a power driven screw assembly.

5. A machine for stacking bars according to claim 1, characterized by the fact that it contains retractable shoulders which move aside at the passage of a layer of bars toward the stacking member and hold back the bars when the support member moves toward the platform on which the layers are formed.

6. A machine for stacking bars according to claim 1, characterized by the fact that the stacking member is formed by spaced supports and the machine includes a carriage having spaced supports susceptible of placing themselves between the supports of the stacking member in order to receive a bundle of bars.

7. A machine for stacking bars according to claim 1, characterized by the fact that each arm contains a shoulder extending above the platform in a manner to determine the position of a layer of bars on the platform.

8. A machine for stacking bars according to claim 7, characterized by the fact that at least one of the arms includes a control means for positioning its shoulder in a manner to adjust the position of the bars of a layer when supported by said one arm relative to the position assumed by the bars of a previous layer.

References Cited

UNITED STATES PATENTS

| | | | |
|---|---|---|---|
| 956,193 | 4/1910 | Scott | 214—6 |
| 2,559,460 | 7/1951 | Peterson | 214—6 |
| 3,307,715 | 3/1967 | Gött et al. | 214—6 |
| 3,347,397 | 10/1967 | Hein | 214—6 |

FOREIGN PATENTS

| | | |
|---|---|---|
| 1,183,020 | 12/1934 | Germany. |
| 1,193,883 | 5/1965 | Germany. |

GERALD M. FORLENZA, *Primary Examiner.*

ROBERT J. SPAR, *Assistant Examiner.*